US012249310B2

(12) United States Patent
Basu et al.

(10) Patent No.: US 12,249,310 B2
(45) Date of Patent: Mar. 11, 2025

(54) SYSTEM AND METHOD FOR ESTIMATING SECONDARY PATH IMPULSE RESPONSE FOR ACTIVE NOISE CANCELLATION

(71) Applicant: Harman International Industries, Incorporated, Stamford, CT (US)

(72) Inventors: Sattwik Basu, Pittsburgh, PA (US); Jeffrey Charles Tackett, Allen Park, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 340 days.

(21) Appl. No.: 17/975,782

(22) Filed: Oct. 28, 2022

(65) Prior Publication Data

US 2024/0147151 A1 May 2, 2024

(51) Int. Cl.
*G10K 11/178* (2006.01)
*H04R 3/02* (2006.01)

(52) U.S. Cl.
CPC .. *G10K 11/17817* (2018.01); *G10K 11/17881* (2018.01); *H04R 3/02* (2013.01)

(58) Field of Classification Search
CPC ....... G10K 11/17881; G10K 11/17817; G10K 11/17854; G10K 2210/3017
See application file for complete search history.

(56) References Cited

U.S. PATENT DOCUMENTS

| | | | | |
|---|---|---|---|---|
| 9,923,550 | B2 | 3/2018 | Argyropoulos et al. | |
| 10,741,162 | B1 * | 8/2020 | Bastyr | G10K 11/17825 |
| 11,100,911 | B1 * | 8/2021 | Jain | G10K 11/17854 |
| 2005/0207585 | A1 | 9/2005 | Christoph | |
| 2010/0014685 | A1 | 1/2010 | Wurm | |
| 2021/0304728 | A1 * | 9/2021 | Wang | G10K 11/17823 |
| 2022/0238092 | A1 * | 7/2022 | Inoue | G10K 11/17825 |
| 2024/0144905 | A1 * | 5/2024 | Basu | G10K 11/17817 |

FOREIGN PATENT DOCUMENTS

| | | | |
|---|---|---|---|
| EP | 2149875 | A1 | 2/2010 |
| EP | 2216774 | A1 | 8/2010 |
| EP | 2996111 | A1 | 3/2016 |
| EP | 2996112 | A1 | 3/2016 |
| EP | 3761307 | A1 | 1/2021 |
| WO | 2022/031279 | A1 | 2/2022 |

* cited by examiner

*Primary Examiner* — Vivian C Chin
*Assistant Examiner* — Annabelle Kang
(74) *Attorney, Agent, or Firm* — Angela M. Brunetti

(57) ABSTRACT

A system and method for estimating secondary path impulse response (IR) for an active noise cancellation (ANC) system to enhance performance of the ANC system in a near-imperceptible manner is provided. An adaptive music interference canceller (AMIC) uses music signals as test signals and ANC error microphones to estimate the secondary path IR between all speakers and microphones. The system validates that the music signals have sufficient audio content to be considered an adequate test signal. Furthermore, the system employs additional signal processing to ensure that a unique IR for all speakers and microphones can be obtained using the audio test signals. New coefficients of the AMIC filter are calculated, in real time, using the music signals and can be copied into the estimated secondary path for the ANC system. A supervisor unit manages enabling and disabling the AMIC as needed for calculating and copying coefficients.

19 Claims, 9 Drawing Sheets

Electrical Domain

SYSTEM AND METHOD FOR ESTIMATING SECONDARY PATH IMPULSE RESPONSE FOR ACTIVE NOISE CANCELLATION

CROSS-REFERENCE TO RELATED APPLICATIONS

The present disclosure is related to U.S. application Ser. No. 17/976,048 entitled "System and Method for Secondary Path Switching for Active Noise Cancellation", the disclosure of which is hereby incorporated in its entirety by reference herein and which are being filed simultaneously.

TECHNICAL FIELD

The present disclosure relates to active noise cancellation, and more particularly, to estimating secondary path impulse response for active noise cancellation.

BACKGROUND

Active noise cancellation (ANC) systems attenuate undesired noise using feedforward and feedback structures to adaptively remove undesired noise within a listening environment, such as within a vehicle cabin. ANC systems cancel, or reduce, unwanted noise by generating cancellation sound waves to destructively interfere with the unwanted audible noise. ANC systems implemented on a vehicle that minimize noise inside the vehicle cabin include a Road Noise Cancellation (RNC) system, which minimizes unwanted road noise, and an Engine Order Cancellation (EOC) system, which minimizes undesirable engine noise inside the vehicle cabin.

Typically, ANC systems use digital signal processing and digital filtering techniques. For example, a noise sensor, such as a microphone, obtains an electrical reference signal representing a disturbing noise signal generated by a noise source. This reference signal is fed to an adaptive filter. The filtered references signal is then supplied to an acoustic actuator, for example a loudspeaker, which generates a compensating sound field, which has an opposite phase to the noise signal. This compensating sound field eliminates, or reduces, the noise signal within the listening environment.

A residual noise signal may be measured, using a microphone, to provide an error signal to the adaptive filter, where filter coefficients (also called parameters) of the adaptive filter are modified such that a norm of the error signal is produced. The adaptive filter may use digital signal processing methods, such as least means square (LMS) to reduce the error signal.

An estimated model that represents an acoustic transmission path from the loudspeaker to the microphone is used when applying the LMS algorithm. This acoustic transmission path is usually referred to as the secondary path of the ANC system. In contrast, the acoustic transmission path from the noise source to the microphone is usually referred to as the primary path of the ANC system.

The quality of the estimation of the secondary path transfer function, or its equivalent impulse response (IR) for the secondary path system influences the stability of the ANC system. A varying secondary path transfer function can have a negative impact on the ANC system because the actual secondary path transfer function, when subjected to variations, no longer matches an "a priori" identified secondary path transfer function that is used within the LMS algorithm. The estimated model is typically measured once during the production tuning process and approximates the secondary path transfer function and during the production tuning process, the secondary path transfer function is estimated for a "nominal" acoustic scenario (i.e., one occupant, windows closed, seats in default positions). However, the acoustic path can vary for many different reasons, like changes in occupancy count, seat positions, items in the listening environment. These differences may lead to large error signals being measured, which leads to diverging adaptive filters, which leads to undesirable noise in the listening environment. For example, noise boosting.

There is a need to provide ANC that improves adaptation speed and adaptation quality for parameters of the secondary path filter, as well as robustness of the ANC system.

SUMMARY

A system and method for estimating secondary path impulse response (IR) in an active noise cancellation system. A secondary path IR estimator has an adaptive music interference canceller (AMIC). When music signals being played through loudspeakers in the vehicle cabin have sufficient audio content to be used as a test signal for the ANC, adaptation of the AMIC is enabled and new coefficients are calculated for the transfer function for the AMIC. When the conditions in the cabin are sufficient, adaptation of the AMIC is disabled and the newly calculated coefficients of the transfer function for the AMIC are copied into coefficients of a transfer function for the ANC.

In one or more embodiments, the ANC system is a MIMO system and the AMIC of the secondary path IR estimator has a low frequency decorrelator unit.

In one or more embodiments, the decorrelator unit has parallel crossover filters to separate the music signals into low frequency bandwidth and high frequency bandwidth signals. A non-linear transform decorrelates at least some of the low frequency bandwidth signals. An adder combined the decorrelated low frequency bandwidth signals with the high frequency bandwidth signals to generate an input to the AMIC and vehicle cabin speaker system. The input is used to calculate new coefficients of the transfer function for the AMIC.

In one or more embodiments, the system has a supervisor unit for managing updates, including enabling and disabling adaptation of the AMIC.

In one or more embodiments, the supervisor unit monitors spectral descriptors of the music signals to determine when the music signals have audio spectral content that is sufficient to be used as a test signal for the ANC.

In one or more embodiments, the supervisor unit formats the new coefficients generated by the AMIC into a format that matches the coefficients of the transfer function for the ANC system.

In one or more embodiments, the newly calculated coefficients are copied into the transfer function for the ANC system by blending the newly calculated coefficients with existing coefficients over a predetermined time.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1-7, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

For background, a least mean square, LMS, algorithm is used to approximate a solution for the least mean squared problem. This algorithm may be implemented, for example, using digital signal processors. The LMS algorithm is based on a method of the steepest descent and computes a gradient in a simple manner. The algorithm operates in a time-recursive fashion.

Figure 1:
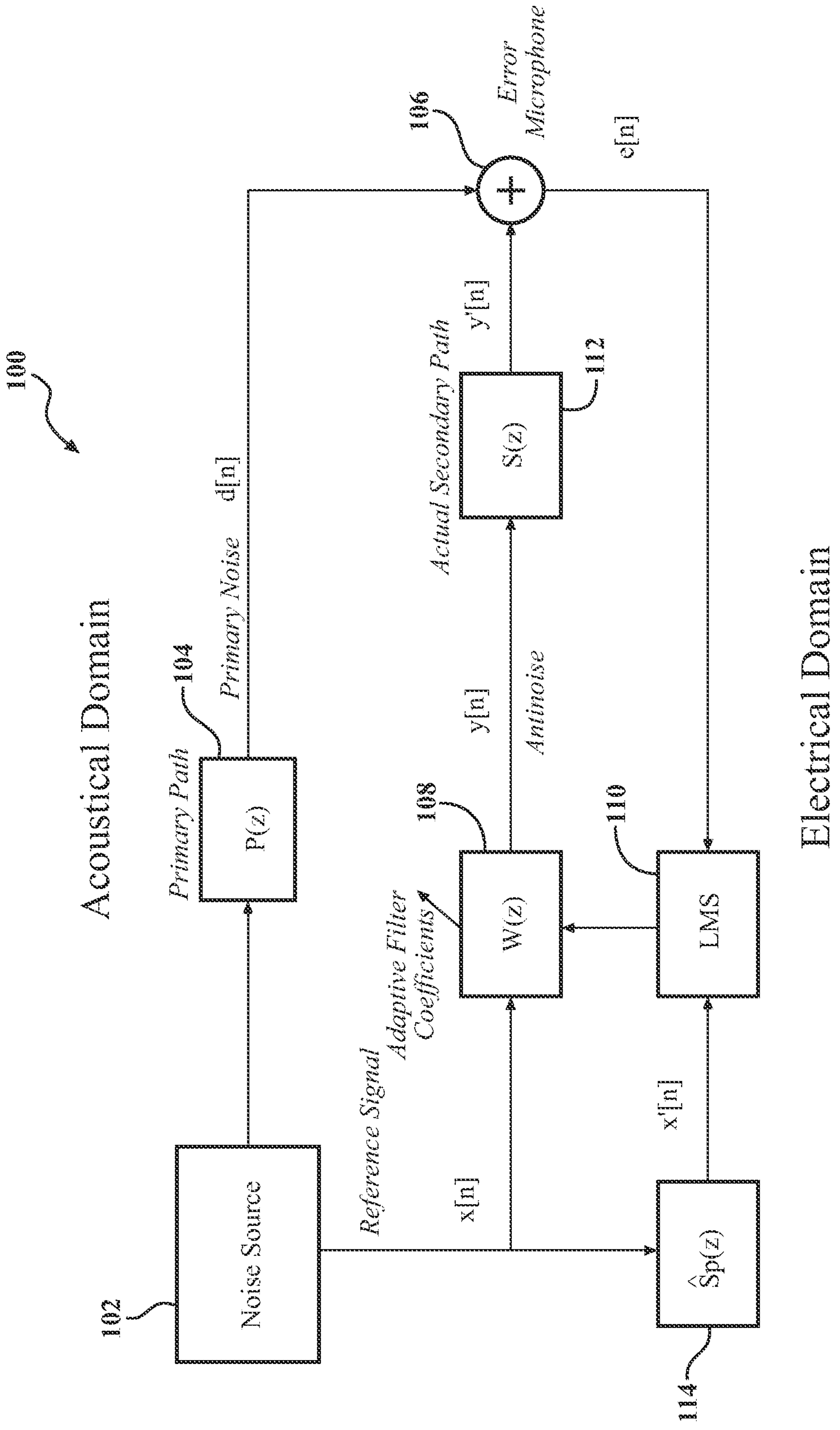
FIG. 1. is a block diagram of an Active Noise Cancellation (ANC) system having a filtered least mean squared (FxLMS) filter.
Figure 2:
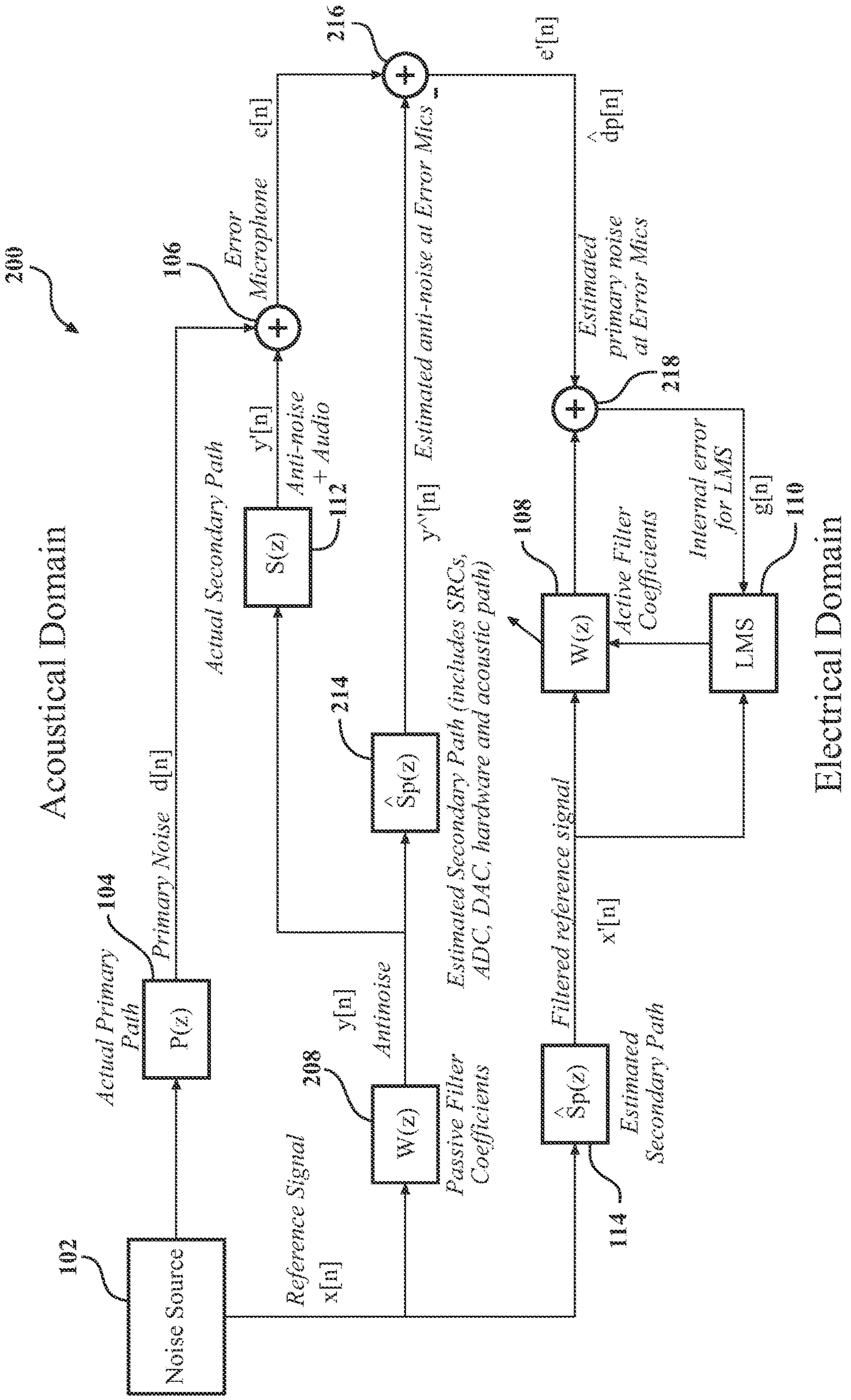
FIG. 2 is a block diagram of an ANC system having a modified filtered least mean squared (MFxLMS) filter.

The ANC system may use a Filtered x-LMS (FxLMS) algorithm (see FIG. 1), or modifications or extensions thereof such as a Modified Filtered-x LMS (MFxLMS) algorithm (see FIG. 2). In each of FIGS. 1 and 2, the elements are divided between an acoustical domain and an electrical domain. Also, each system may be a scalable, multiple-input-multiple-output (MIMO) system that operates for multiple speaker outputs, multiple error microphones, and, in the case of a listening environment that is a vehicle cabin, multiple engine orders. However, for simplicity in describing the inventive subject matter the description hereinafter includes one speaker, one error signal, and one reference signal. One skilled in the art can extend application of the inventive subject matter to any number of speakers, microphones, and reference signals.

FIG. 1 is directed to FxLMS, wherein a digital feedforward ANC system 100 includes a noise source 102 and a primary noise signal, d[n], that passes through a filter 104 having a primary path transfer function, P(z). P(z) represents the transfer characteristics of a signal path between the noise source 102 and an error microphone 106. An adaptive filter 108 has a transfer function, W(z), having an adaptation unit 110 that calculates a set of filter coefficients (also called parameters) for the adaptive filter 108. An actual secondary path system 112 has a transfer function, S(z), downstream of the adaptive filter 108. The transfer function, S(z), represents a signal path between a loudspeaker that radiates a compensation signal and a position in the listening environment. An anti-noise signal, y[n], includes the transfer characteristics of all components downstream of the adaptive filter 108, including, for example, amplifiers, digital-to-analog converters, loudspeakers, acoustic transmission paths, microphones, and analog-digital converters. An estimated secondary path system 114, has a transfer function $\hat{S}_p(z)$ of the actual secondary path transfer function S(z), and is used by the adaptation unit 110 to calculate the filter coefficients of the transfer function for the adaptive filter 108. The primary path filter 104 and the actual secondary path filter 112 represent the physical properties of the listening environment. The transfer functions W(z), S(z), and $\hat{S}_p(z)$ are implemented in a digital signal processor.

Noise source 102 provides a signal to the primary path filter 104 which provides a disturbing noise signal, d[n], to the error microphone 106. The noise source 102 also provides a reference signal, x[n] to the adaptive filter 108, which imposes a phase shift and outputs a filtered anti-noise signal y[n] to the actual secondary path transfer function 112 which outputs a signal, y'[n], that destructively superposes the primary noise signal d[n]. The reference signal, x[n], may be derived from a source that is correlated with the primary noise source 102, such as engine RPM or accelerometers. A measurable residual signal represents an error signal, e[n], for the adaptation unit 110. The estimated secondary path transfer function $\hat{S}_p(z)$ is used to calculate updated filter coefficients. This compensates for decorrelation between the anti-noise signal y[n] and a filtered anti-noise signal, y'[n], due to signal distortion in the secondary path. The secondary path transfer function $\hat{S}_p(z)$ also receives the reference signal, x[n], from the noise source 102 and provides a modified reference signal x'[n] to the adaptation unit 110.

The quality of the estimated secondary path transfer function $\hat{S}_p(z)$ influences the stability of the ANC system 100. Deviation of the estimated secondary path transfer function $\hat{S}_p(z)$ from the actual secondary path transfer function S(z) affects convergence and stability behavior of the adaptation unit 110. Unstable behavior may be caused by changes in the ambient conditions in the listening environment. For example, when the listening environment is a vehicle cabin, changes in ambient conditions may occur when a window is opened, the seats are adjusted, or there are items (or passengers) on a seat in the listening environment.

In practice, a dynamic system of the secondary path adapts itself to the changing ambient conditions in real time. Such a system is shown in block diagram FIG. 2 that is like the filter arrangement shown in FIG. 1 but includes an additional adaptive filter arrangement in parallel with the secondary path system. FIG. 2 is directed to a modified filtered-x LMS (MFxLMS) and is directed to a digital feedforward ANC system 200. The reference signal x[n] is filtered by the first secondary path filter 114 with the adaptive filter 108 having transfer function W(z) which estimates the secondary path. Coefficients of the first secondary path filter 114 are referred to as active filter coefficients. The dynamic system also includes a second adaptive filter 208 which filters the reference signal x[n] with a transfer function W(z) to generate the anti-noise signal y[n]. The anti-noise signal y[n] is filtered by the actual secondary path system 112. The signal y'[n] is audible anti-noise at the error microphone 106 as filtered by the filter 112 with the actual secondary path transfer function S(z). The filtered anti-noise signal y'[n] is combined at the error microphone with primary noise d[n] as filtered by the actual primary path system 104 transfer function P(z).

In the electrical domain, the anti-noise signal y[n] is filtered by a second secondary path filter 214 using a transfer characteristic $\hat{S}_p(z)$ and subtracted from the error signal, e[n], at an adder 216. The result is an estimated noise signal, $\hat{d}_p[n]$, at the error microphone 106. The estimated noise signal $\hat{d}_p[n]$ is combined with the signal filtered by the first adaptive filter 108 at adder 218 to generate an internal error signal g[n]. The internal error signal g[n] is feedback for the adaptation unit 110.

In practice, the secondary path estimate IRs are estimated only once for the listening environment with optimal conditions. For a vehicle cabin listening environment, this takes place only during the production tuning process before the vehicle leaves the production facility. Furthermore, the secondary path estimate IRs represent the listening environment under a nominal scenario. For example, when the listening environment is a vehicle cabin, a nominal scenario is the vehicle in park, not moving, with one driver, and all windows, doors, and trunk closed.

The estimation process involves playing a test signal to excite the electro-acoustic path followed by a deconvolution step to determine the IRs. These estimates remain fixed thereafter for the lifetime of the vehicle. When acoustics within the listening environment change during runtime, for example when the vehicle is being driven with one or more windows down and multiple passengers or items in seats, a mismatch between the actual and stored IRs is created.

In a listening environment in real time, the stored IRs for $\hat{S}_p(z)$ may differ from the actual acoustic transfer function S(z), and this mismatch may eventually result in divergence of the W(z) filters, leading to degraded ANC performance and noise boosting. When $\hat{S}_p(z)$ better matches S(z), the resulting error feedback signal more accurately represents what is really happening in the listening environment and adaptive filters W(z) are much more likely to avoid divergence. Additionally, when $\hat{S}_p(z)$ better matches S(z), a more aggressive tuning approach may be used to increase the cancellation performance because the risk of divergence has been eliminated.

To improve the accuracy of the stored estimates, the inventive subject matter calculates secondary path IRs, online in real time, in a near-imperceptible manner and updating the stored estimates with newly calculated secondary path IRs. It applies to FxLMS and MFxLMS systems described in FIGS. 1 and 2, to calculate $\hat{S}_p(z)$ parameters without the need for generating a test signal. The inventive subject matter also finds unique $\hat{S}_p(z)$ solutions under MIMO conditions. And the inventive subject matter determines if, when, and how to change the $\hat{S}_p(z)$ parameters.

The system, and method, calculates and updates the stored estimates in a manner that is nearly imperceptible to the listener in the listening environment. Any updates that are made to the transfer function coefficients will be inaudible to a listener in the listening environment. The update is so slight, gradual, or subtle that it is not perceived by or affects the listener's senses making it go unnoticed.

Figure 3A:
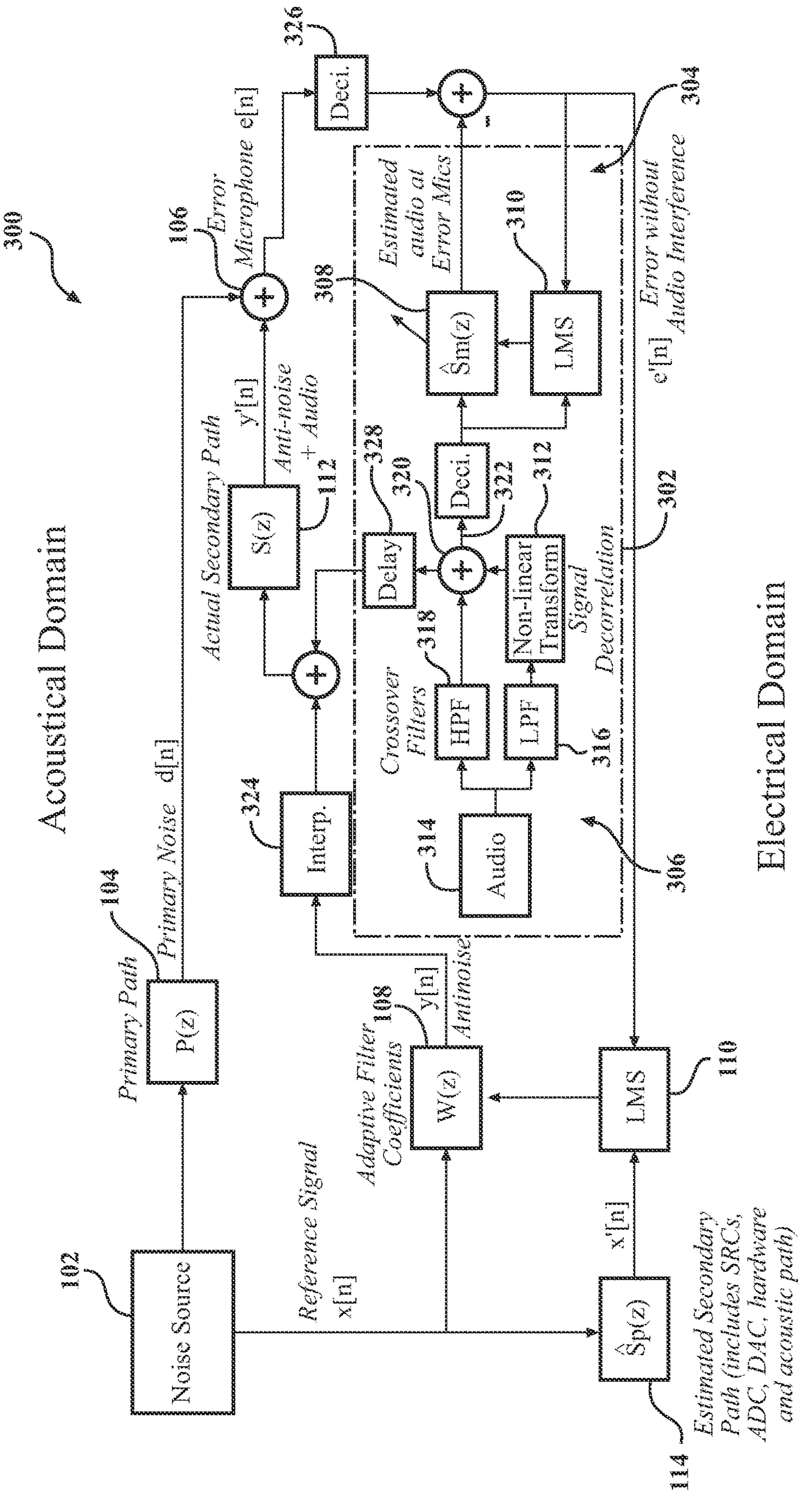
FIG. 3A is a block diagram of the FxLMS system including an Adaptive Music Interference Canceller (AMIC)
Figure 3B:
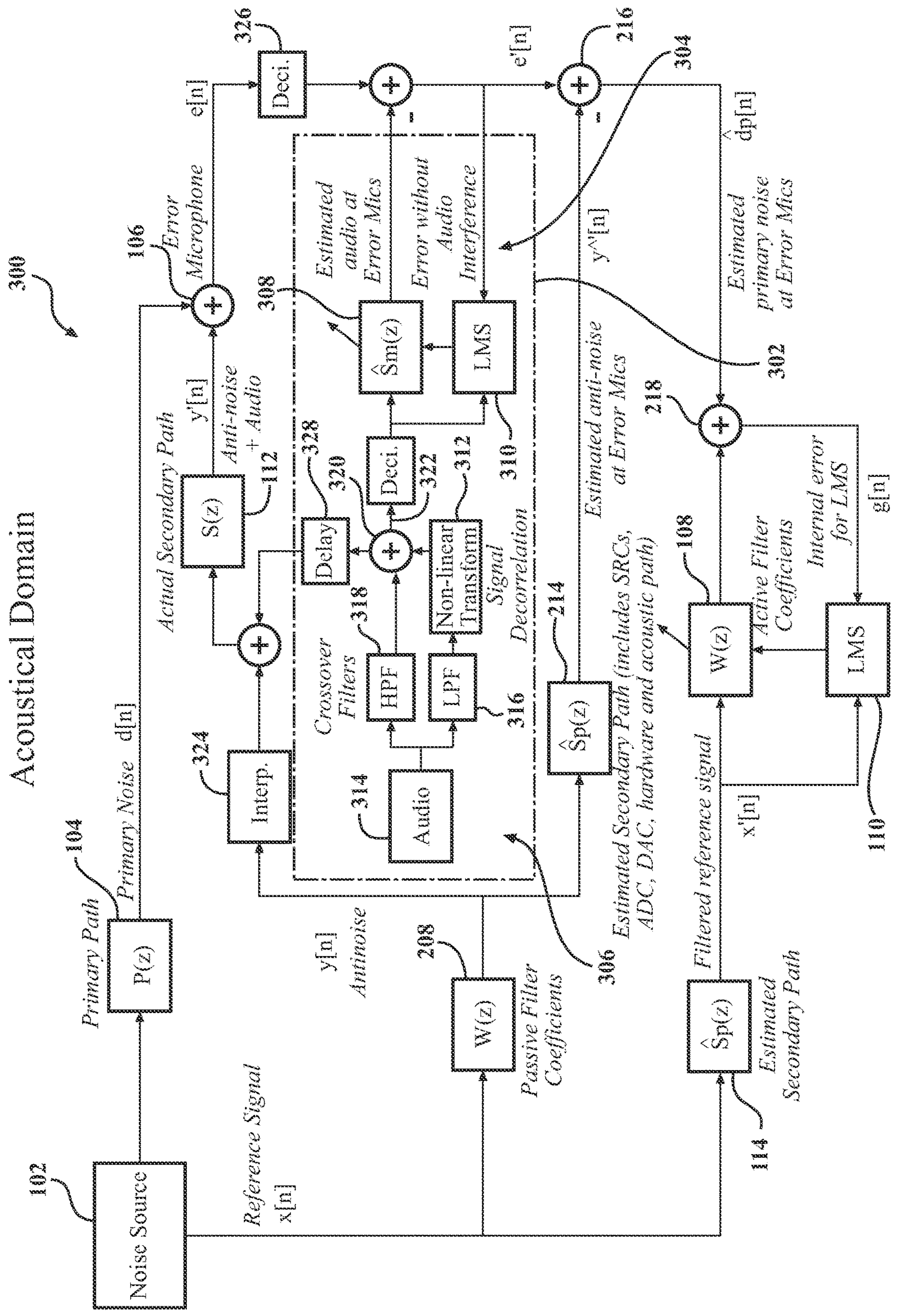
FIG. 3B is a block diagram of the MFxLMS system including an AMIC.

FIGS. 3A and 3B each show a block diagram 300 depicting FxLMS and MFxLMS systems, respectively, with an online secondary path IR estimator 302 (also referred to herein as the IR estimator 302) of the inventive subject matter. Online refers to testing and updating secondary path IRs in real time while the vehicle is in operation, being driven, regardless of a current state of vehicle occupancy, window positions, music being played, etc.

The IR estimator 302 of the inventive subject matter effectively calculates, or estimates, coefficients for the transfer function $\hat{S}_p(z)$ for the ANC system online, using music signals being played, in real time in the vehicle cabin through the vehicle audio system. The music signals are used instead of a test signal. To accomplish this, the IR estimator 302 includes an adaptive music interference canceller (AMIC) 304. The AMIC has a low frequency decorrelator 306 having parallel crossover filters with a transfer function, $\hat{S}_m(z)$ associated with an adaptive filter system 308 for the AMIC 304. The AMIC 304 functions like an acoustic echo canceller (AEC) to remove music content from the ANC error microphone 106 to prevent incorrect adaptation of the transfer function W(z) for adaptive filters 108, 208.

According to the inventive subject matter, whenever the AMIC 304 is provided with music signals that have audio spectral content that is sufficient for the music to be used as a proper test signal and a proper step size, μ, the coefficients of the transfer function $\hat{S}_m(z)$ for the adaptive filter system 308 for the AMIC 304 will converge on the secondary path IRs between loudspeakers (not shown) and microphones 106 in the listening environment. A measurable residual signal represents an error signal without audio interference, e'[n], as feedback for an adaptation unit 310 for calculating coefficients of the transfer function for the adaptive filter 308. Once the AMIC adaptive filter 308 has converged, the coefficients of the transfer function $\hat{S}_m(z)$ may be copied into the transfer function $\hat{S}_p(z)$ to be used as a new secondary path IR estimate for the ANC system.

The music signals 314 should have audio content that is sufficient to allow proper convergence of the AMIC adaptive filter 308. To determine whether the audio content of the music signals 314 is sufficient, spectral descriptors, like spectral flatness, are considered and a determination about the sufficiency of the music signals is made by the IR estimator 302. Acceptable audio content of the music signals 314 will allow for proper convergence. This will be discussed in more detail later herein.

With music signals 314 having sufficient audio content, the IR estimator allows the AMIC adaptive filters to converge. Once the AMIC adaptive filters have converged, the step size, μ, is set to zero. This disables the AMIC 304 once the filters have converged. Disabling the AMIC 304 stops any further adaptation to guarantee that a stable IR is being used by the IR estimator.

A common problem that arises with multi-channel ANC systems is non-uniqueness of solutions to the normal adaptive filter equations. Non-uniqueness of solutions happens because of a strong correlation between the content being played at different loudspeakers and the multi-path coupling between loudspeakers and microphones in the listening environment. To prevent non-uniqueness of solutions, the IR estimator 302 includes a low frequency decorrelator 306 to provide enough decorrelation to find unique $\hat{S}_p(z)$ solutions under MIMO conditions. To accomplish this, the low frequency decorrelator 306 decorrelates loudspeaker output signals from each other before being played through the loudspeakers. Decorrelating the audio signals transforms the signals into multiple signals that, individually, sound like the original signal but their waveforms are different and have little correlation between them. Typically, linear predictive coding or nonlinear processing is used for signal decorrelation. However, each of these methods for decorrelation may introduce audible distortions in the music. The goal of using the music signals as a test signal involves making the test signal imperceptible to the listener while conducting the test.

To prevent any audible distortions of the music signals 314, the IR estimator 302 applies decorrelation to only a small bandwidth of the music signals 314. The low frequency decorrelator 306 splits the music signals into low and high frequency bands by applying parallel crossover filters 316, 318, for example Linkwitz-Riley filters. In-vehicle ANC systems typically only target frequencies below 1000 Hz and low frequencies make up only a small fraction of the auditory spectrum, so a cutoff frequency for the Linkwitz-Riley filters may be set to cover only the necessary low frequency bandwidth prior to decorrelation. For example, for Engine Order Cancellation (EOC) the cutoff frequency may be set to 600 Hz. Any distortions in this band are generally imperceptible to a listener. The music signals 314 are modified enough, in the small bandwidth, to make them unique to each speaker channel without introducing audible distortions into the music. The decorrelation over the small bandwidth, in this case the low frequency bandwidth, decreases the audibility of the decorrelation process making it effective for mathematically decorrelating the speaker signals to avoid non-uniqueness while remaining imperceptible to a listener in the listening environment.

The decorrelated low frequency signals are summed at adder 320 with the high frequency signals from high pass filter 318 and the resultant transformed signal 322 may be used as a test signal, or reference signal, to the AMIC adaptive filter 308. Because decorrelation is only applied to the low frequency portion of the music signals, it remains imperceptible in the transformed signal 322. Therefore, the transformed signal 322 becomes a substitute for a test signal, and as a test signal it remains imperceptible to a listener. This makes it possible to perform the test online in real time using the music signals as a test signal.

Once the AMIC adaptive filter 308 converges, the $\hat{S}_m(z)$ parameters may be copied directly into $\hat{S}_p(z)$. However, as discussed above, before copying the coefficients, the AMIC 304 should be disabled, or frozen. Because the acoustics in the vehicle cabin may change in the middle of an update, disabling the AMIC ensures that a stable impulse response is being used.

Optionally, if needed, $\hat{S}_m(z)$ may be formatted prior to copying coefficients. The $\hat{S}_m(z)$ filter 308 may not include the interpolation and decimation processing that is applied to the y[n] signal. $\hat{S}_m(z)$ may need to be formatted so that it can be used directly as a replacement for $\hat{S}_p(z)$. Formatting may be done in more than one manner. For example, before coefficients are copied, processing is performed to convolve the interpolation 324 and decimation 326 of filter coefficients with that of $\hat{S}_m(z)$. Another example technique may be to simply include a fixed delay 328 on the music signals 314 after decorrelation 312. The fixed delay 414 approximates a delay induced by the interpolation and decimation filters. In this scenario, no further processing is required to modify $\hat{S}_m(z)$, but more memory is required.

Prior to copying the new coefficients into $\hat{S}_p(z)$, the existing coefficients of $\hat{S}_p(z)$ should be stored in memory where they are accessible in the event there is a need to revert back to the existing coefficients. For example, after copying the new coefficients into $\hat{S}_p(z)$, if divergence is detected to be ongoing, the secondary path IR estimator 302 will revert back to the coefficients of $\hat{S}_p(z)$ that were stored prior to copying.

Figure 4:
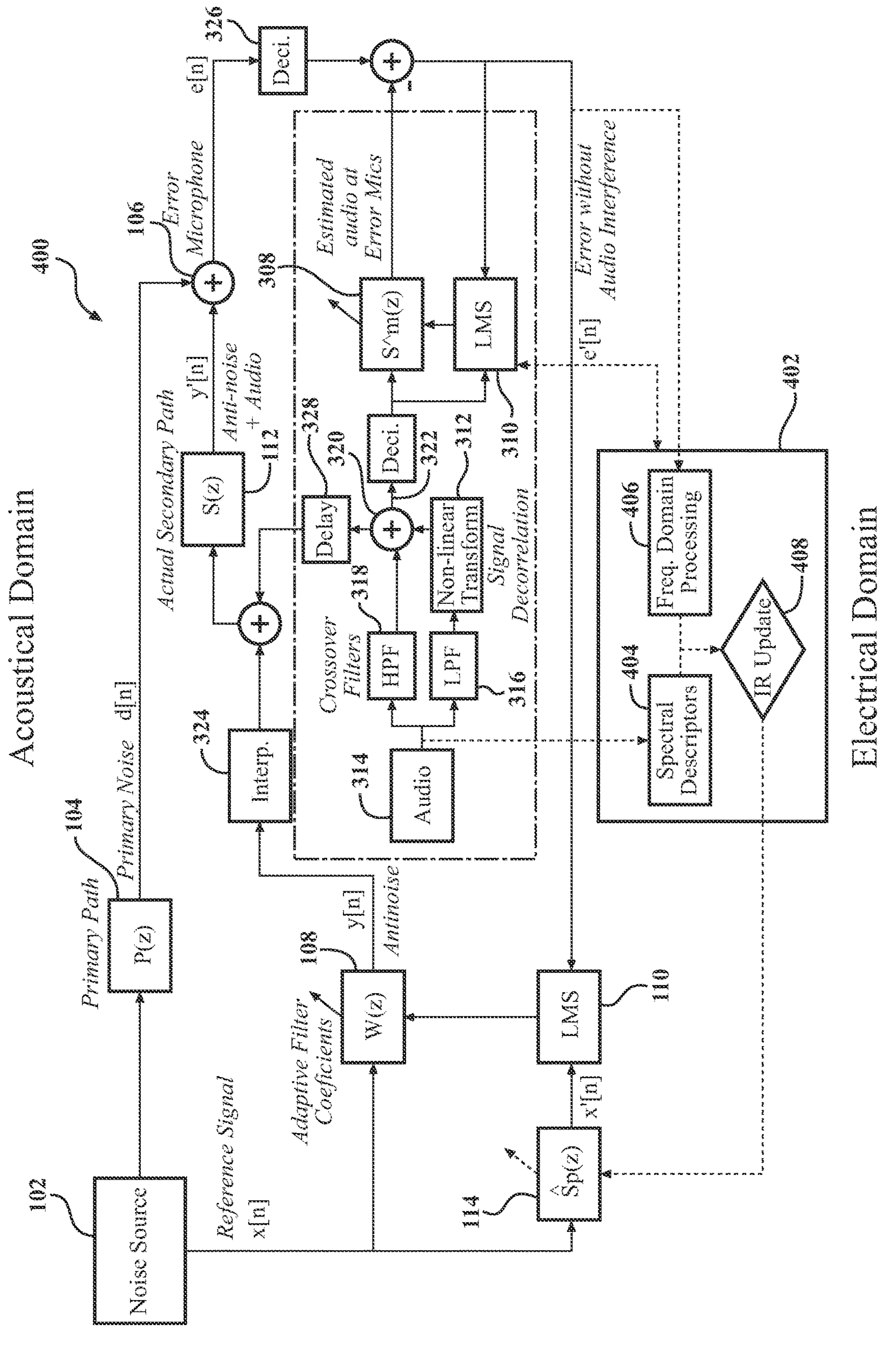
FIG. 4 is a block diagram of the MFxLMS system of FIG. 3B including a supervisor unit.

It should be noted that updates enabled by the IR estimator 302 are not meant to take place continuously. A supervisor unit may determine if, when, and how to enable the IR estimator 302 to calculate and update coefficients of the secondary path transfer function for the ANC. Referring now to FIG. 4, a block diagram 400 shows a supervisor unit 402 for the IR estimator 302. For simplicity, the supervisor unit 402 shown in FIG. 4 is directed to a FxLMS. However, one skilled in the art can apply the supervisor unit to a MFxLMS as well without departing from the scope of the inventive subject matter.

The supervisor unit 402 uses secondary path update logic 408 to determine if an update should take place, to determine when the music signals 314 may be used as a proper test signal, and to determine when to initiate the update. Lastly, the secondary path update logic unit 408 may determine how the update will be made to avoid further deterioration of the AMIC 304 or ANC 300 system while the vehicle is running.

The supervisor unit 402 determines if an update should take place when the adaptive filter coefficients are diverging. By monitoring predetermined signal processing parameters 406 in the frequency domain, in real time, the secondary path update logic 408 compares S(z) and $\hat{S}_p(z)$. When the comparison results in a difference that exceeds a predetermined threshold range, the supervisor unit 402 has detected that S(z) is significantly different than $\hat{S}_p(z)$. When this significant difference is detected, the supervisor unit 402 has determined that new coefficients should be calculated and that an update should be made.

During the comparison of S(z) and $\hat{S}_p(z)$, the supervisor unit 402 may also consider the error signal without audio interference, e'[n], of the AMIC adaptive filter 308. An error in the AMIC algorithm that exceeds a predetermined threshold may indicate that the $\hat{S}_m(z)$ filters are diverging from the actual secondary path IRs S(z) and a new estimate for $\hat{S}_p(z)$ should be calculated. Upon a determination that there is a sufficient difference, for example, the difference exceeds the predetermined threshold range, the supervisor unit 402 enables AMIC 304 adaptation.

The supervisor unit 402 then applies logic 408 to manage the process for calculating and updating coefficients of the secondary path transfer function $\hat{S}_p(z)$ for ANC. Upon determining that an update should take place, before calculating and updating the secondary path IRs, the supervisor unit 402 determines whether the music signals 314 may be used as a proper test signal. The supervisor unit 402 monitors and analyzes the music signals 314 to determine whether the music signals 314 have adequate audio content to be used as a proper test signal. One way in which this determination may be made is by looking at spectral descriptors 404 in the music signals 314. Spectral descriptors 404 are functions that describe features of music signals. When music signals 314 have sufficient spectral descriptors, they are considered adequate to ensure that the AMIC adaptive filters 308 will converge and, therefore, may be used in place of what would normally be a test signal. To avoid a negative effect on the ANC system, the AMIC adaptive filters 308 should only be adapted when the audio content is sufficiently flat over the required bandwidth. Therefore, spectral flatness is one indicator that the audio content will allow proper convergence of the AMIC filters and that the audio content of the music signals 314 is sufficient to be used as a proper test signal.

Once the music signals 314 are determined to be a proper test signal, the supervisor unit 402 determines when to initiate adjustment of the filter parameters by copying new coefficients derived from proper convergence of the AMIC filters into $\hat{S}_p(z)$. One way that this may be accomplished is to consider a signal-to-noise ratio of ANC microphones in the listening environment. When the background noise in the listening environment is much higher than the music being played, the background noise may dominate the $\hat{S}_m(z)$ filter adaptation. Therefore, when background noise dominates, any update to $\hat{S}_p(z)$ should be delayed until a point in time where there is more music content relative to background noise.

Once the supervisor unit 402 has determined that the filter parameters for $\hat{S}_p(z)$ may be adjusted, the AMIC adaptive algorithm 308, 310 is disabled, or frozen, so that when adjustments are made, they do not cause further deterioration in AMIC and ANC performance.

Figure 5:
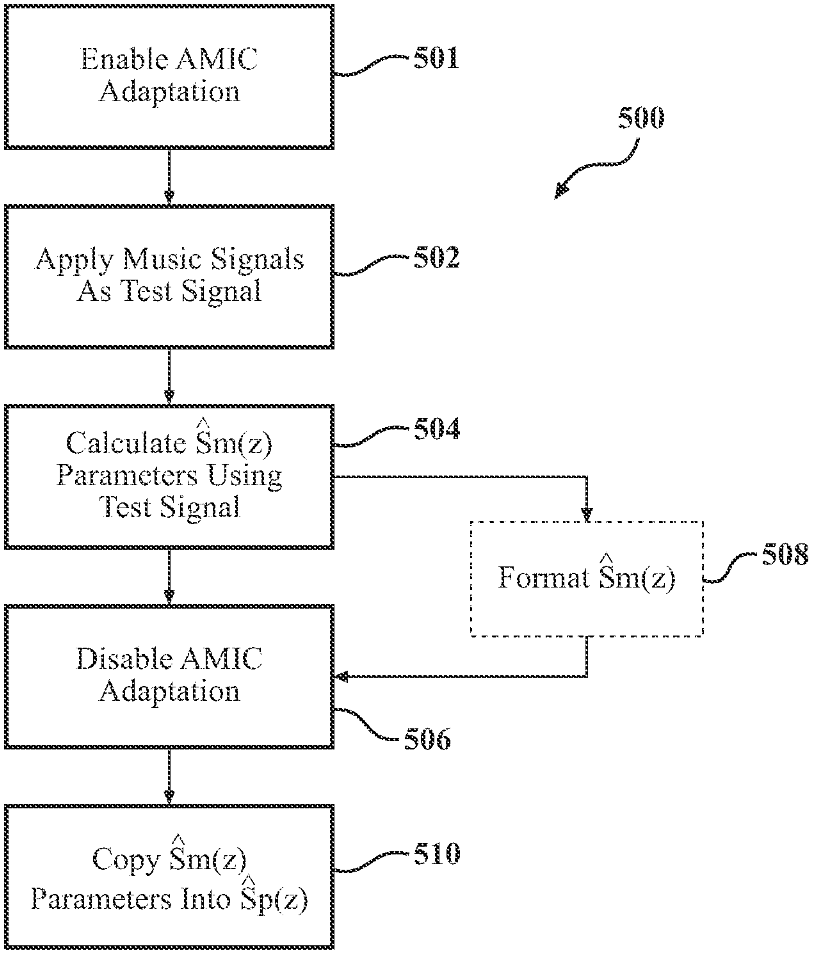
FIG. 5 is a flow chart of a method for estimating secondary path impulse response (IR) in an ANC system.

Referring now to FIG. 5, a flowchart of a method 500 for calculating and updating the $\hat{S}_p(z)$ parameters of an ANC system online, in real time, using a secondary path IR estimator is shown. The method may be carried out by executing instructions with one or more devices, such as a processor or a controller, stored in a memory, including non-transitory memory. The processor receives sensors from various sensors of the vehicle audio system and the processor carries out the steps based on the received signals and the instructions stored in non-transitory memory.

At step 501, the AMIC adaptive algorithm is enabled.

At step 502, the method includes using the music signals at the AMIC as a test signal to calculate coefficients of the secondary path transfer function $\hat{S}_m(z)$ associated with AMIC to replace coefficients of the secondary path transfer function $\hat{S}_p(z)$ associated with the ANC system, in real time while the vehicle is on the road, in use, and music is being played through the vehicle audio system in the vehicle cabin.

At step 504, the method includes the IR estimator calculating $\hat{S}_m(z)$ parameters and allowing the AMIC adaptive filters to converge.

At step 506, after AMIC adaptive filters converge the method includes disabling the AMIC adaptive algorithm by setting the step size, μ, to zero. Setting the step size to zero stops any adaptation at the AMIC and ensures that a stable impulse response is being used while the newly calculated coefficients of $\hat{S}_m(z)$ are being copied as coefficients of $\hat{S}_m(z)$.

While the step size, μ, is zero, but before coefficients are copied, the method may include an optional step 508 of formatting $\hat{S}_m(z)$ so that the formats for each transfer function $\hat{S}_p(z)$ and $\hat{S}_m(z)$ match. Formatting may be accomplished using more than one technique. For example, the $\hat{S}_m(z)$ filter may not include the interpolation and decimation transfer functions that are typically applied to an anti-noise signal, y[n]. One technique for the optional step of formatting 508 may be further processing $\hat{S}_m(z)$ so that it can be used directly as a replacement for $\hat{S}_p(z)$. Additional processing is performed to convolve the interpolation and decimation of filter coefficients with that of $\hat{S}_m(z)$. Another technique may be to simply include a fixed delay on the music signals after decorrelation that approximates a delay induced by the interpolation and decimation filters. In this scenario, no further processing is required to modify $\hat{S}_m(z)$, but more memory is required.

At step 510, the newly calculated $\hat{S}_m(z)$ coefficients are copied directly into $\hat{S}_p(z)$.

Figure 6A:
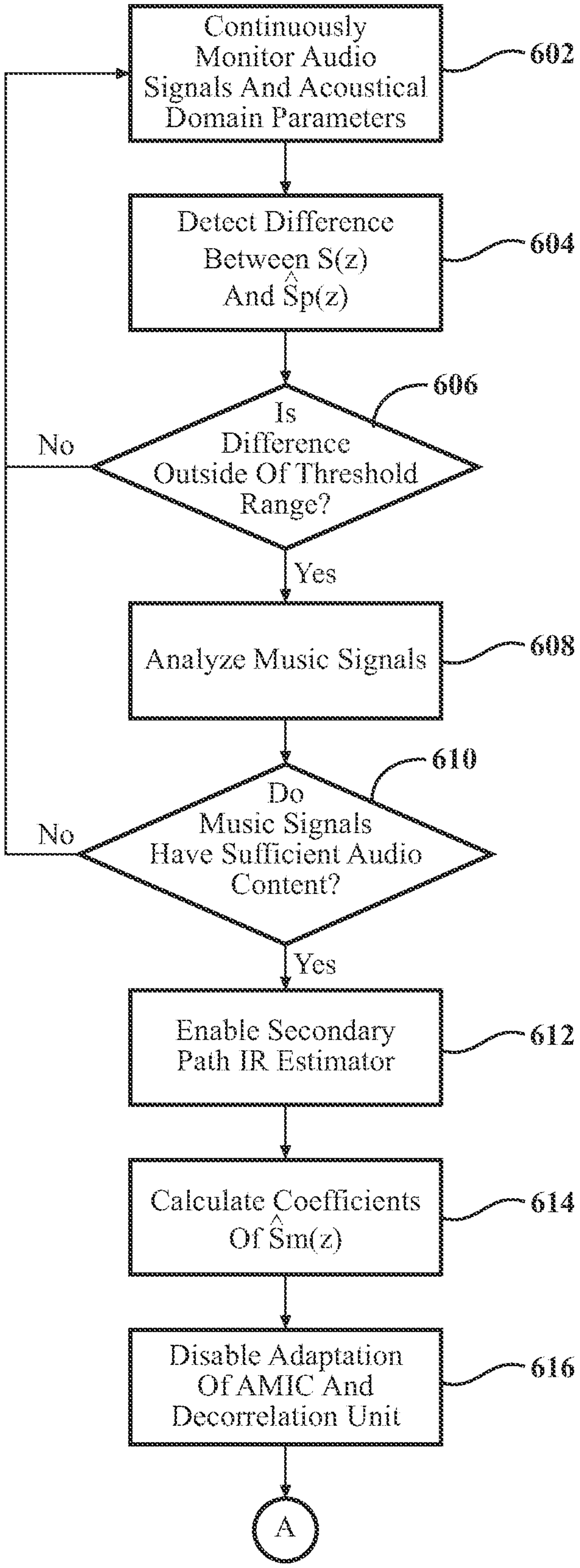
FIGS. 6A and 6B are a flow chart of a method for supervising estimating secondary path IR in an ANC.
Figure 6B:
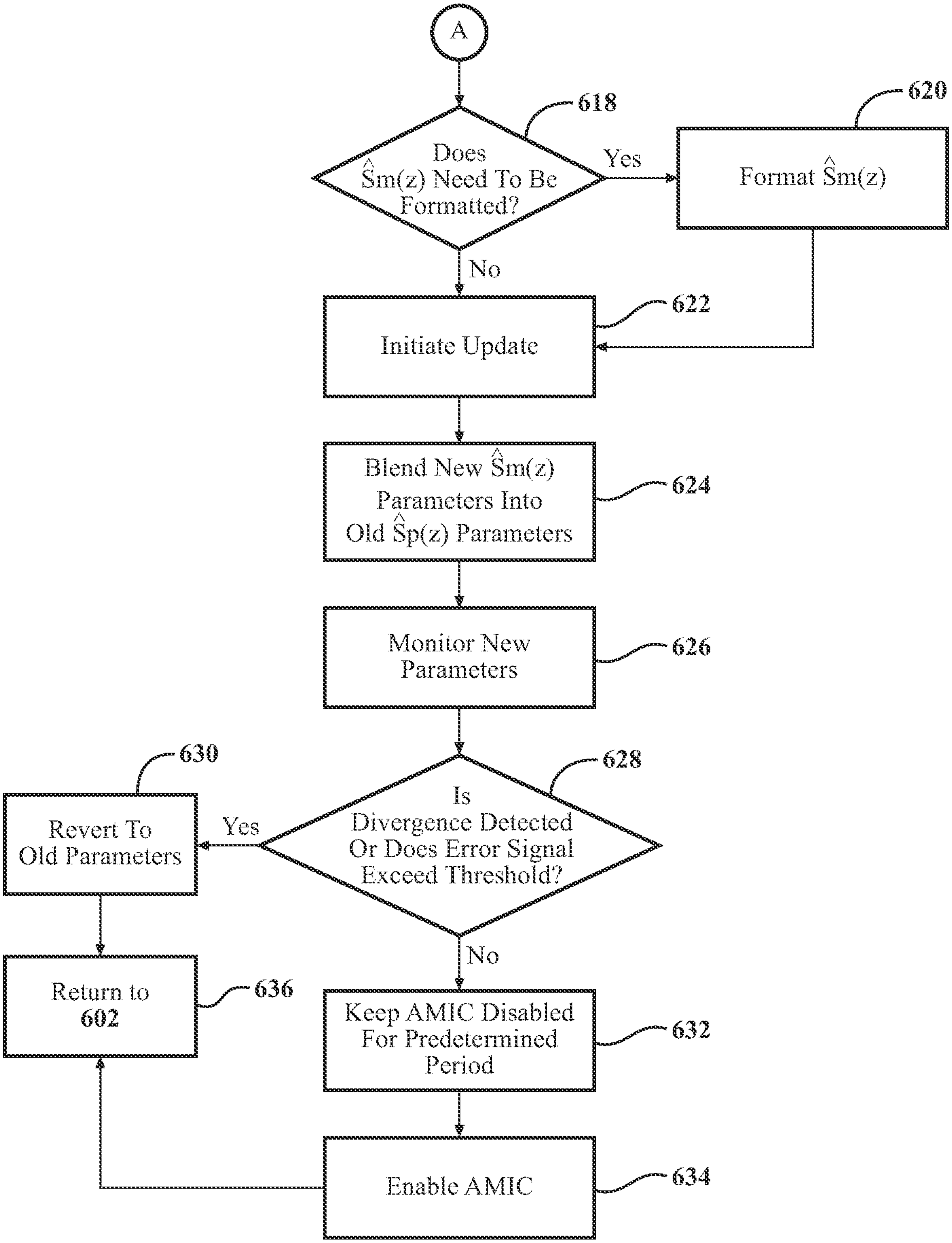

FIGS. 6A and 6B are a flowchart of a method 600 for calculating and updating the $\hat{S}_p(z)$ parameters of an ANC system online, in real time, using a supervisor unit to manage the secondary path IR estimator.

The method 600 includes the step of continuously monitoring 602 audio signal and acoustical domain parameters. The method includes the step of detecting 604 a difference between S(z) and $\hat{S}_p(z)$. As discussed above, one way to detect the difference is to monitor the error signal without audio interference, e'[n]. At step 606, the method includes the step of determining when the difference is outside of a predetermined threshold range. If the difference is detected to be within the predetermined threshold range, the method continuously monitors 602 audio signal and acoustical domain parameters.

When the difference is detected to be outside of the predetermined threshold range, the method includes the step of analyzing 608 the music signals. The music signals are analyzed by assessing content of the signal. Analysis of the music signals prompts the method to determine 610 if the music signals have sufficient audio content to be considered a proper test signal. For the music signal to be considered a proper test signal, the audio content must meet predetermined criteria. For example, and as discussed earlier herein, flatness.

When the music signals do not exhibit sufficient audio content to be considered a proper test signal, the method continues to continuously monitor 602 audio signal and acoustical domain parameters. When the music signals do have sufficient audio content to be considered a proper test signal the method includes enabling 612 the secondary path IR estimator and calculating 614 the coefficients of $\hat{S}_m(z)$ by allowing the AMIC adaptive filter system to converge.

Once the AMIC adaptive filter system has converged, the method includes disabling 616 the AMIC. Disabling the AMIC stops adaptation and guarantees that a stable IR will be used.

The method determines 618 if $\hat{S}_m(z)$ needs to be formatted to allow the parameters for $\hat{S}_m(z)$ to be copied directly into $\hat{S}_p(z)$. If formatting is needed, the method includes formatting 620 $\hat{S}_m(z)$.

Once formatting 620 is complete, or if formatting is not needed, the method includes initiating 622 the update of the parameters to copy the newly calculated parameters from $\hat{S}_m(z)$ into $\hat{S}_p(z)$. The method includes blending 624 old $\hat{S}_p(z)$ parameters with the newly calculated $\hat{S}_m(z)$ parameters. The blending 624 is a smooth slewing, over a tunable or variable time constant, of the parameters to prevent or minimize audible artifacts. An abrupt switch may cause audible artifacts such as pops or clicks that could degrade ANC performance. A time constant for slewing may be tunable, or variable, in the range of 100 ms to several seconds for completion.

Once the coefficients of $\hat{S}_p(z)$ are replaced with the coefficients from $\hat{S}_m(z)$, the method includes monitoring 626 the new parameters for a predetermined amount of time. The method includes determining 628 the accuracy of the updated coefficients. If either divergence is occurring or error signals exceed a predetermined threshold range, the method includes reverting back 630 to the previous parameters. Accuracy may be determined by considering the error signal, e'[n], gradient of error, or pre-existing stability control for ANC.

If divergence is not detected or the error remains within the predetermined threshold range, the method includes keeping 632 the AMIC inactive for a predetermined period, upon which expiration, the method includes reactivating 634 the AMIC. After either reverting 630 back to old parameters or reactivating 634 the AMIC, the method includes returning 636 to the step of continuously monitoring 602 audio signal and acoustical domain parameters.

Figure 7:
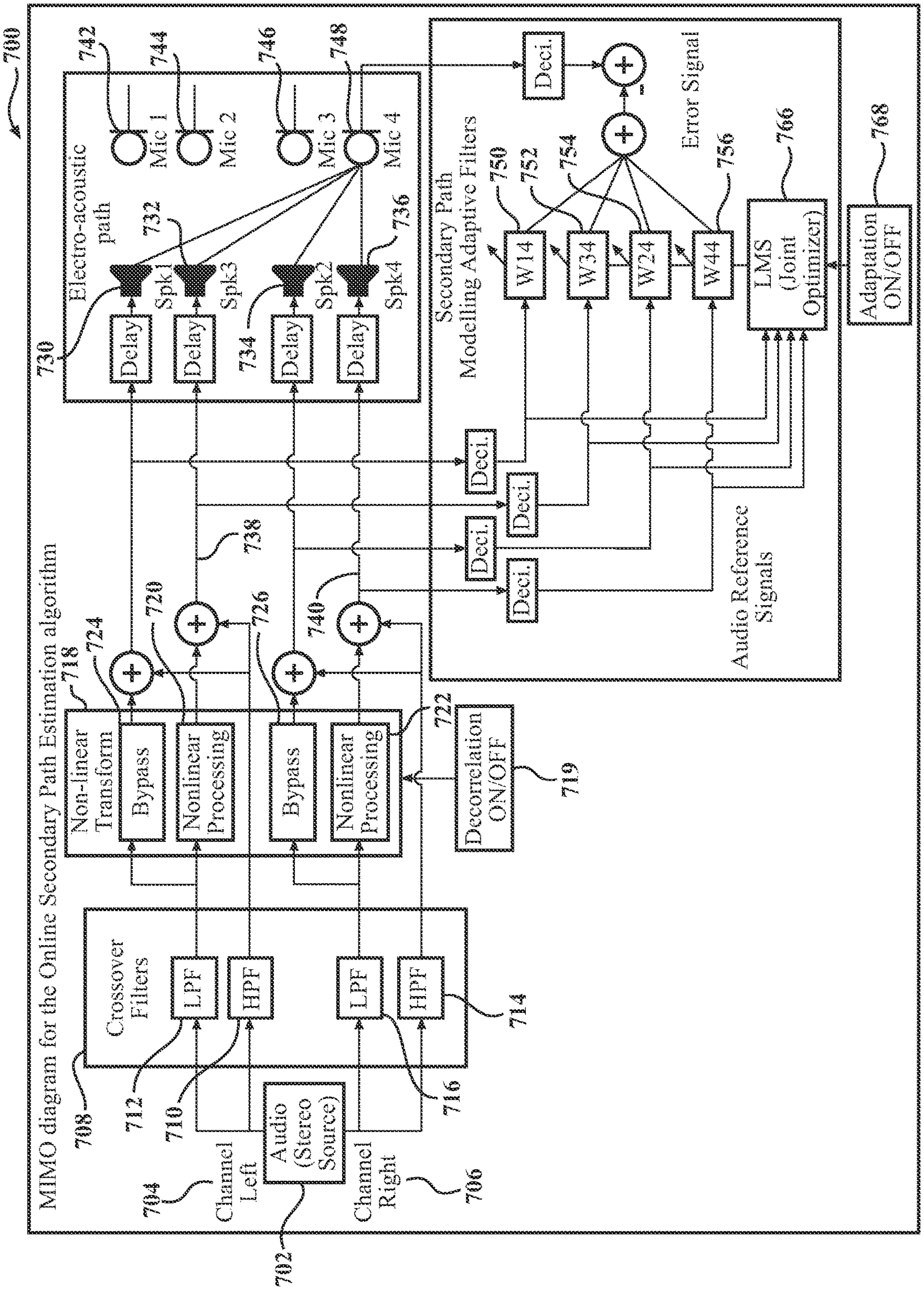
FIG. 7 is a Multiple-Input-Multiple-Output (MIMO) block diagram for one or more embodiments of a real time secondary path estimation unit.

FIG. 7 is a block diagram 700 showing one or more embodiments of the real time secondary path estimator applied to a MIMO system for a listening environment that has four speakers and four microphones. A stereo source 702 provides music signals to a left channel 704 and a right channel 706. The left 704 and right 706 channel signals are filtered by parallel crossover filters 710, 712, 714, 716, such as Linkwitz-Riley crossover filters 708. A signal from the left channel 704 is filtered through high-pass filter 710 and low-pass filter 712. A signal from the right channel 706 is filtered through high-pass filter 714 and low-pass filter 716.

Non-linear transform 718 is controlled ON or OFF 719 by the supervisor for the secondary path estimator logic unit.

When ON, the non-linear transform 718 decorrelates at least some of the low frequency bandwidth signals, 720 for the left channel and 722 for the right channel. The high frequency bandwidth signals, 724 for the left channel and 726 for the right channel, are not subjected to decorrelation.

In the present example, the stereo source 702 is mixed to four loudspeakers 730, 732, 734, and 736. Loudspeakers 730 and 734 receive signals that are unprocessed. Loudspeakers 732 and 736 receive signals that have undergone non-linear processing 738, 740.

In practice, for a system with four loudspeakers and four microphones, there are a total of sixteen adaptive filters W(z) to cover each loudspeaker to each microphone 742, 744, 746, 748. However, for simplicity, only four adaptive filters 750, 752, 754, and 756 for microphone 748 are being shown. Each signal undergoes decimation 758, 760, 762, 764. The supervisor unit controls a joint LMS operator 766 to freeze and/or unfreeze 768 the secondary path estimator which enables or disables secondary path filter adaptation.

In prior approaches to the problem of diverging adaptive filters W(z), the solution was to reduce step size, $\mu$, and which oftentimes results in disabling the ANC. The inventive subject matter provides the capability to return the ANC system to baseline performance. The step size for adaptive filters W(z) do not need to be lowered because the inventive subject matter creates a more stable system by matching $\hat{S}_p(z)$ to S(z). Also realized is the potential to make cancellation performance more consistent than a system used during production tuning with a "nominal" static $\hat{S}_p(z)$ measurement.

Additionally, the inventive subject matter uses music signals that are already being played through the audio system and being listened to when measuring $\hat{S}_p(z)$. The decorrelation process is applied only to the low frequency bandwidth of interest and is only run periodically, resulting in a measurement approach that is imperceptible to the listener in the vehicle.

Yet another advantage may be realized through more aggressive tuning values being used for the ANC algorithm at the time of its initial setup. The ANC algorithm no longer needs to be tuned conservatively because the inventive subject matter reduces the possibility of a mismatch occurring between the estimated and actual secondary paths once the vehicle leaves the manufacturing facility and is in use on the road.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above for one or more embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A system for estimating secondary path impulse response (IR) in an active noise cancellation (ANC) system having an estimated secondary path IR filter system and coefficients of a transfer function $\hat{S}_p(z)$ associated with the estimated secondary path IR filter system S(z) for active noise cancellation (ANC), the system comprising:

a secondary path IR estimator comprising;

an adaptive music interference canceller (AMIC) in the secondary path IR estimator;

music signals input to the AMIC;

an adaptive filter system for the AMIC;

the secondary path IR estimator applying the music signals as a test signal for a vehicle cabin speaker system;

the adaptive filter system for the AMIC is enabled by the secondary path IR estimator to calculate new coefficients of a transfer function $\hat{S}_m(z)$ for the AMIC; and the secondary path IR estimator copies the new coefficients of the transfer function $\hat{S}_m(z)$ for the AMIC to the coefficients of the transfer function $\hat{S}_p(z)$ for the ANC system.

2. The system as claimed in claim 1, wherein the ANC system is a MIMO system and the AMIC of the secondary path IR estimator further comprises a low frequency decorrelator.

3. The system as claimed in claim 2, wherein the low frequency decorrelator further comprises:

parallel crossover filters to separate the music signals into low frequency bandwidth signals and high frequency bandwidth signals;

a non-linear transform to decorrelate at least some of the low frequency bandwidth signals; and an adder to combine the decorrelated low frequency bandwidth signals with the high frequency bandwidth signals thereby generating an input to the AMIC and the vehicle cabin speaker system for calculating the new coefficients of the transfer function $\hat{S}_m(z)$ for the AMIC.

4. The system as claimed in claim 3 wherein the secondary path IR estimator further comprises a supervisor unit to manage updates to the coefficients of the transfer function $\hat{S}_p(z)$ for the ANC system.

5. The system as claimed in claim 4, wherein;

a difference between a transfer function S(z) of an actual secondary path for ANC and a transfer function $\hat{S}_p(z)$ for the ANC system is detected by the supervisor unit;

the supervisor unit determines when the difference is outside of a predetermined threshold range; and the supervisor unit enables the secondary path IR estimator to calculate the new coefficients of the transfer function $\hat{S}_m(z)$ for the AMIC using the music signals to be copied into the coefficients of the transfer function $\hat{S}_p(z)$ for the ANC system.

6. The system as claimed in claim 5, wherein the supervisor unit monitors spectral descriptors of the music signals to determine when the music signals have audio spectral content that is sufficient to be used as the test signal.

7. The system as claimed in claim 6, wherein when sufficient audio spectral content is determined, the supervisor unit enables the secondary path IR estimator to calculate new coefficients $\hat{S}_m(z)$ for the AMIC; and when the new coefficients of $\hat{S}_m(z)$ are calculated the supervisor unit disables the AMIC 304 until the new coefficients are copied into the coefficients of the transfer function $\hat{S}_p(z)$ for the ANC system.

8. The system as claimed in claim 7, wherein:

prior to copying the coefficients, the supervisor unit determine when the new coefficients generated by the AMIC are in a format that matches a format for the coefficients of the transfer function $\hat{S}_p(z)$ for the ANC system; and when the formats do not match, the format for the new coefficients calculated by the AMIC are reformatted to match the format for the coefficients of the transfer function $\hat{S}_p(z)$ for the ANC system.

9. The system as claimed in claim 1, wherein when copying the new coefficients into the coefficients of the transfer function $\hat{S}_p(z)$ for the ANC system, the secondary path IR estimator blends the new coefficients with existing coefficients of the transfer function $\hat{S}_p(z)$ for the ANC system over a predetermined period.

10. The system as claimed in claim 1, wherein an accuracy of the updated coefficients of the transfer function $\hat{S}_p(z)$ for the ANC system is determined by monitoring predetermined signals to detect divergence.

11. The system as claimed in claim 10, wherein an error signal e'[n] is used to determine the accuracy of the updated coefficients of the transfer function $\hat{S}_p(z)$ for the ANC system.

12. A method for estimating secondary path impulse response (IR) in an active noise cancellation (ANC) system having an estimated secondary path IR filter system with coefficients of a transfer function $\hat{S}_p(z)$ for the ANC system, and an adaptive music interference canceller (AMIC) with coefficients of a transfer function $\hat{S}_m(z)$ for the AMIC, the method is carried out by a processor executing instructions stored in non-transitory memory, the method comprising the steps of:

applying music signals as an input to a vehicle cabin speaker system and as a test signal for the ANC;

calculating new coefficients of the transfer function $\hat{S}_m(z)$ for the AMIC; and copying the new coefficients of the transfer function $\hat{S}_m(z)$ for the AMIC to the coefficients of the transfer function $\hat{S}_p(z)$ for the ANC system.

13. The method as claimed in claim 12, further comprising the steps of:

separating the music signals into low frequency bandwidth signals and high frequency bandwidth signals;

decorrelating at least some of the low frequency bandwidth signals; and combining the decorrelated low frequency bandwidth signals with the high frequency bandwidth signals to define an input to the AMIC for calculating the new coefficients of the transfer function $\hat{S}_m(z)$ for the AMIC.

14. The method as claimed in claim 12, further comprising the steps of:

detecting a difference between the transfer function $\hat{S}_p(z)$ associated with the ANC system and a transfer function S(z) associated with an actual secondary path of the ANC system;

determining when the difference is outside of a predetermined threshold range; and enabling the AMIC to calculate new coefficients of the transfer function $\hat{S}_m(z)$ for the AMIC to be copied into coefficients of the transfer function $\hat{S}_p(z)$ for the ANC system.

15. The method as claimed in claim 14, further comprising the step of disabling the AMIC before copying the new coefficients calculated for $\hat{S}_m(z)$ to the coefficients of the transfer function $\hat{S}_p(z)$ for the ANC system.

16. The method as claimed in claim 14, wherein prior to enabling the AMIC to calculate new coefficients, the method further comprises the step of validating the music signals have audio spectral content that is sufficient for calculating the new coefficients.

17. The method as claimed in claim 12, wherein prior to the step of copying the new coefficients, the method further comprises the step of formatting the new coefficients calculated by the AMIC to match a format of the coefficients of the transfer function $\hat{S}_p(z)$ for the ANC system.

18. The method as claimed in claim 12, wherein the step of copying the new coefficients further comprises the step of blending the new coefficients into the transfer function $\hat{S}_p(z)$ for the ANC system over a predetermined time.

19. The method as claimed in claim 12, after the step of copying the new coefficients, the method further comprising the steps of:

monitoring the new coefficients copied into the transfer function $\hat{S}_p(z)$ for the ANC system while the AMIC remains disabled for a predetermined period;

detecting a difference between the transfer function $\hat{S}_p(z)$ for the ANC system and a transfer function S(z) associated with the actual secondary path;

determining when the difference is outside of a predetermined threshold range; and reverting to the coefficients that were in use prior to copying.

* * * * *